United States Patent
Zortman (10) Patent No.: US 9,235,065 B1
(45) Date of Patent: Jan. 12, 2016

(54) THERMALLY TUNEABLE OPTICAL MODULATOR ADAPTED FOR DIFFERENTIAL SIGNALING

(71) Applicant: Sandia Corporation, Albuquerque, NM (US)

(72) Inventor: William A. Zortman, Corrales, NM (US)

(73) Assignee: Sandia Corporation, Albuquerque, NM (US)

( * ) Notice: Subject to any disclaimer, the term of this patent is extended or adjusted under 35 U.S.C. 154(b) by 12 days.

(21) Appl. No.: 14/151,637

(22) Filed: Jan. 9, 2014

(51) Int. Cl.
| | |
|---|---|
| *G02F 1/11* | (2006.01) |
| *G02F 1/01* | (2006.01) |
| *G02F 1/025* | (2006.01) |
| G02F 1/21 | (2006.01) |
| G02F 1/03 | (2006.01) |
| G02B 6/12 | (2006.01) |

(52) U.S. Cl.
CPC ............... *G02F 1/011* (2013.01); *G02F 1/025* (2013.01); *G02B 2006/12142* (2013.01); *G02F 1/0115* (2013.01); *G02F 1/0136* (2013.01); *G02F 1/0147* (2013.01); *G02F 1/0311* (2013.01); *G02F 1/218* (2013.01)

(58) Field of Classification Search
CPC ....... G02F 1/025; G02F 1/011; G02F 1/0115; G02F 1/0136; G02F 1/01708; G02F 1/0311; G02F 1/218; G02F 1/0147; G02F 2203/50; G02B 2006/12142
See application file for complete search history.

(56) References Cited

U.S. PATENT DOCUMENTS

| | | | | |
|---|---|---|---|---|
| 8,519,803 B2 * | 8/2013 | McLaren | ............... | H01P 1/2084 333/17.1 |
| 8,600,201 B2 * | 12/2013 | Thacker | ............. | G02B 6/12007 385/14 |
| 8,948,553 B2 * | 2/2015 | Taillaert | ............. | G02B 6/12007 385/129 |
| 2009/0245296 A1 * | 10/2009 | Santori et al. | .................... | 372/20 |
| 2009/0245714 A1 * | 10/2009 | Bratkovski et al. | ............... | 385/2 |

(Continued)

OTHER PUBLICATIONS

Biberman, et al., "Adiabatic micoring modulators," Optics Express. vol. 20, Issue 28, pp. 29223-29236 (2012).

(Continued)

*Primary Examiner* — Eric Wong
*Assistant Examiner* — Mary A El Shammaa
(74) *Attorney, Agent, or Firm* — Martin I. Finston (57) ABSTRACT

An apparatus for optical modulation is provided. The apparatus includes a modulator structure and a heater structure. The modulator structure comprises a ring or disk optical resonator having a closed curvilinear periphery and a pair of oppositely doped semiconductor regions within and/or adjacent to the optical resonator and conformed to modify the optical length of the optical resonator upon application of a bias voltage. The heater structure comprises a relatively resistive annulus of semiconductor material enclosed between an inner disk and an outer annulus of relatively conductive semiconductor material. The inner disk and the outer annulus are adapted as contact regions for a heater activation current. The heater structure is situated within the periphery of the optical resonator such that in operation, at least a portion of the resonator is heated by radial conductive heat flow from the heater structure. The apparatus further includes a substantially annular isolation region of dielectric or relatively resistive semiconductor material interposed between the heater structure and the modulator structure. The isolation region is effective to electrically isolate the bias voltage from the heater activation current.

16 Claims, 6 Drawing Sheets

(56) References Cited

U.S. PATENT DOCUMENTS

2009/0263078 A1* 10/2009 Hosomi et al. .................. 385/14
2010/0158429 A1*  6/2010 Popovic .............................. 385/3
2011/0293216 A1* 12/2011 Lipson et al. .................... 385/14
2013/0336613 A1* 12/2013 Meade et al. .................... 385/14

OTHER PUBLICATIONS

Cunningham J.E., et al., "Highly-efficient thermally-tuned resonant optical filters", Optics Express, vol. 18, No. 18 pp. 19055-19063 (2010).
Krishnamoorthy et al., "Exploiting CMOS Manufacturing to Reduce Tuning Requirements for Resonant Optical Devices," IEEE Photonics Journal, Exploiting CMOS Manufacturing, vol. 3, No. 3 (2011).
U.S. Appl. No. 13/860,978, DeRose and Zortman.
U.S. Appl. No. 13/861,135, Zortman and Jones.
Li, Guoliang et al., "Ring Resonator Modulators in Silicon for Interchip Photonic Links," IEEE Journal of Selected Topics in Quantum Electronics, vol. 19, No. 6 (2013).
Timurdogan et al., "Vertical Junction Silicon Microdisk Modlator with Integrated Thermal Tuner," in CLEO: 2013, OSA Technical Digest (online) (Optical Societ of America, 2013), paper CTu2F.2. http://www.opticsinfobase.org/abstract,cfm?URI+CLEO_sI-2013_Ctu2F.2.
Timurdogan et al., "Vertical Junction Silicon Microdisk Modulators at 25Gb/s," In Optical Fiber Communication Conference/National Fiber Optic Engineers Conference 2013, OSA Technical Digest (online) (Optical Society of America, 2013), paper OTh3H.2. http://www.opticsinfobase.org/abstrat.cfm?URI+OFC-2013-OTh3H.2.
Shainline et al., "Depletion-mode polysilicon optical modulators in a bulk complementary metal-oxide semiconductor process," Optics Letters, vol. 38, No. 15, pp. 2729-2731 (2013).
Watts, et al., "Vertical junction silicon microdisk modulators and switches," Optics Express 19 pp. 21989-22003; (Oct. 24, 2011).

* cited by examiner

THERMALLY TUNEABLE OPTICAL MODULATOR ADAPTED FOR DIFFERENTIAL SIGNALING

STATEMENT OF GOVERNMENTAL INTEREST

This invention was developed under Contract DE-AC04-94AL85000 between Sandia Corporation and the U.S. Department of Energy. The U.S. Government has certain rights in this invention.

FIELD OF THE INVENTION

This invention relates to resonant optical modulators.

ART BACKGROUND

One type of optical modulator that has promise for high-speed applications such as exascale computing and next generation optical communications is the resonant optical modulator. A resonant optical modulator includes an optical resonator that is typically a waveguiding ring or disk of silicon, although other geometries and other materials are not excluded. An input and output optical beam is coupled to the resonator by directing the beam through a waveguide, which may e.g. be a rectilinear planar waveguide, situated within an evanescent coupling distance of the resonator.

Within a characteristic wavelength band, such a modulator is relatively transmissive when light coupled into the modulator excites a resonant mode of the resonator, and is less transmissive when it goes out of resonance with the coupled light. The resonance may be controlled by, e.g., thermal or electronic modification of the optical velocity within the resonator.

One of the advantages of resonant modulators relative to competing technologies is that they occupy a relatively small volume, and as a consequence are conservative as to wafer real estate and as to power demands. One of the challenges in the area of resonant modulators is to maintain the advantage of small volume, while accommodating such features as heaters for thermal tuning, and such signal isolation as is necessary in order to accommodate differentially driven modulation signals.

SUMMARY OF THE INVENTION

We have developed a resonant, ring-type optical modulator that incorporates a heater for thermal tuning and that further accommodates differentially driven modulation signals.

As will be seen below, our new design uses a radial heater, and the heater and the modulator each have a dedicated pair of electrical contacts. The use of dedicated contacts allows for either AC or DC coupling of the input signal with the danger of electrical interference between the heater and modulator substantially reduced, or even eliminated.

As known in the art, it is possible to provide the input signal with AC coupling even when the modulator and heater share a common ground. However, by providing a second ground contact in our radial design, we minimize the chance that variations in the heater current will shift the ground potential communicated to the modulator. Such a problem is likely when there is a shared ground contact, particularly in a chip densely interconnected with very thin wires.

In our radial design, the additional contact offers the further possibility of a DC-coupled input signal. As a consequence, differential signaling is also possible. Differential signaling has many advantages. Among others, it offers compatibility with common signaling regimes already in existence. It also offers noise immunity, and it is compatible with contemporary CMOS technology operating with internal logic voltage levels below one volt.

In our radial design the center contact of the heater circuit is also screened so that it is electrically isolated from the modulator circuit. In the differential signaling application this means that the outer heater contact can be made to be at the common mode potential, thereby minimizing interference with the differential signaling scheme.

Furthermore, the heater contacts will conduct heat into the electrical connection network. Having dedicated heater contacts will allow this network to be isolated from the signaling network. While the signaling network will also conduct heat, the ability to isolate the two networks will minimize thermal interference between modulators.

Accordingly, an embodiment of the invention in one aspect is an apparatus for optical modulation, including a modulator structure and a heater structure. The modulator structure comprises a ring or disk optical resonator having a closed curvilinear periphery and a pair of oppositely doped semiconductor regions within and/or adjacent to the optical resonator and conformed to modify the optical length of the optical resonator upon application of a bias voltage.

The heater structure comprises a relatively resistive annulus of semiconductor material enclosed between an inner disk and an outer annulus of relatively conductive semiconductor material. The inner disk and the outer annulus are adapted as contact regions for a heater activation current. The heater structure is situated within the periphery of the optical resonator such that in operation, at least a portion of the resonator is heated by radial conductive heat flow from the heater structure.

The apparatus further includes a substantially annular isolation region of dielectric or relatively resistive semiconductor material interposed between the heater structure and the modulator structure. The isolation region is effective to electrically isolate the bias voltage from the heater activation current.

An embodiment of the invention in a second aspect is a method for modulating an optical signal. The method includes coupling the optical signal to a ring or disk resonator via evanescent optical coupling, wherein the resonator describes a closed curvilinear shape having an interior. The method further includes tuning the resonator with heat flowing radially outward from a heating element situated in the interior of the closed curvilinear shape; and modifying an optical length of the resonator through application of a bias voltage, wherein the bias voltage is applied by differential signaling.

DETAILED DESCRIPTION

It has long been known that elements that shift the phase of an optical signal in response to an input signal are extremely useful for the control of optical signals, both as such and as components of more complex devices. For example, filters, switches, and modulators can all be constructed, at least in part, from phase-shifting elements.

Useful phase-shifting elements have been based on various underlying physical phenomena. Among these phenomena is the free-carrier effect in semiconductive optical media, whereby the refractive index of the optical medium at a given wavelength is dependent on the density of free carriers, i.e. of mobile electrons and/or holes, in the medium.

The fabrication and testing of free-carrier modulators has been reported. For example, Michael R. Watts et al., "Vertical junction silicon microdisk modulators and switches," *Optics Express* 19 (24 Oct. 2011) 21989-22003, the entirety of which is hereby incorporated herein by reference, reports a free-carrier modulator, implemented in silicon, in which the application of a forward or reverse bias voltage modulates the carrier density in the region of a pn junction. Changes in the carrier density lead to changes in the refractive index in the optical path, which lead, in turn, to modulation of the phase of the propagating optical signal.

More specifically, the device that Watts et al. describes is a resonant free-carrier modulator whose resonant frequency $\omega_m$ exhibits a shift $\Delta\omega_m$ that is proportional to $\omega_m$ and depends on the overlap between the change of the depletion width in the junction region, and the energy distribution of the guided resonant optical mode. The depletion width, in turn, is controlled by a bias voltage applied across the junction. Accordingly, it will be understood that the same electro-refractive effect that modulates the refractive index can also be used to shift the resonant frequency of the device, thus leading to applications in spectrally selective modulation and filtering.

As an example of how the refractive index can depend on carrier concentrations, we note here that Watts et al., citing work by others, provides an empirical expression for the refractive index change Δn in the junction region in silicon at a wavelength of 1550 nm, given by $$\Delta n = AN^B + jCN^D,$$

where $j^2 = -1$, N is the electron or hole concentration, and the parameters A, B, C, and D are provided in the following table:

|  | A (× $10^{-24}$) | B | C (× $10^{-24}$) | D |
|---|---|---|---|---|
| For electrons | −23.7 | 1.08 | 0.0492 | 1.2 |
| For holes | −3,930,000 | 0.82 | 1.96 | 1.1 |

As an example of how the depletion width can be varied by a voltage applied across the junction, we note here that Watts et al., citing the well-known depletion approximation, provides the following estimate for the depletion width w:

$$W = \sqrt{\frac{2\varepsilon}{q} \cdot \frac{N_A + N_D}{N_A N_D}} (V + \varphi_B),$$

where $\varepsilon$ is the dielectric constant, q is the electronic charge, V is the applied voltage, $\phi_B$ is the built-in potential, and $N_D$ and $N_A$ are respectively the donor and acceptor concentrations.

Figure 1:
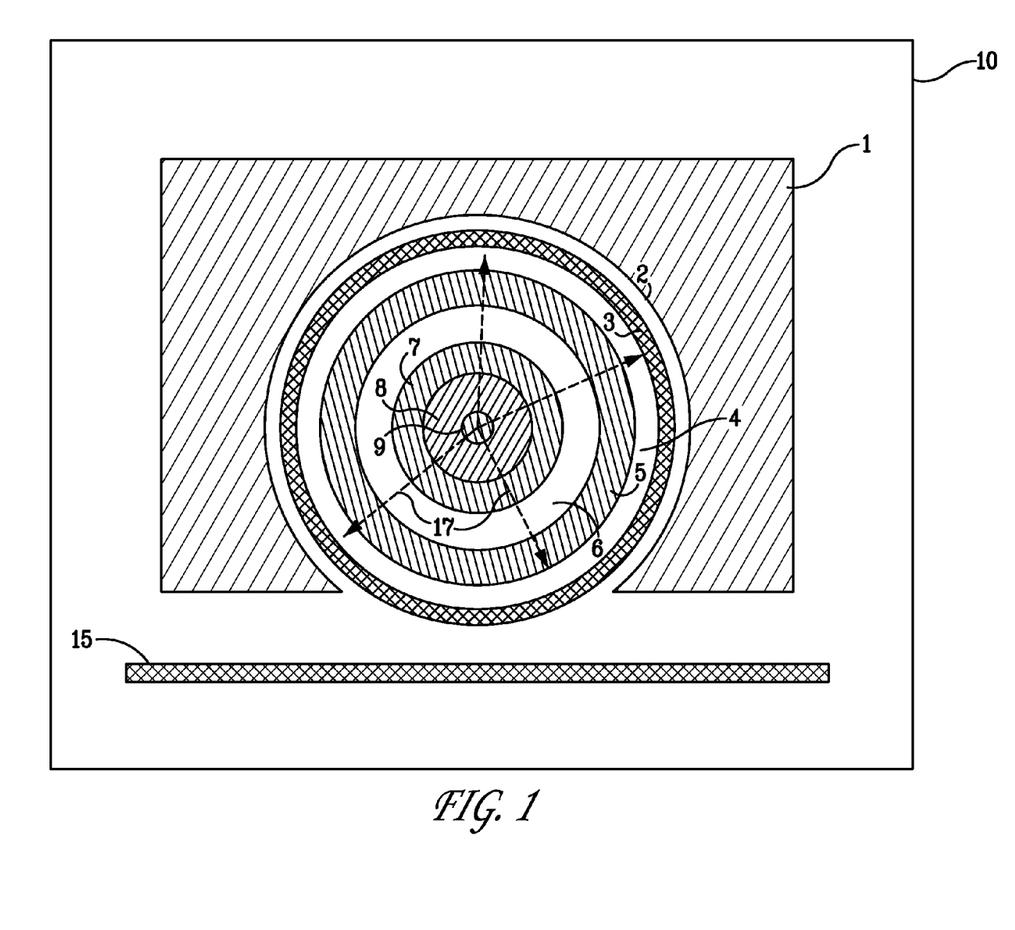
FIG. 1 is a top-down plan view of an optical modulator according to the invention in one embodiment.
Figure 2:
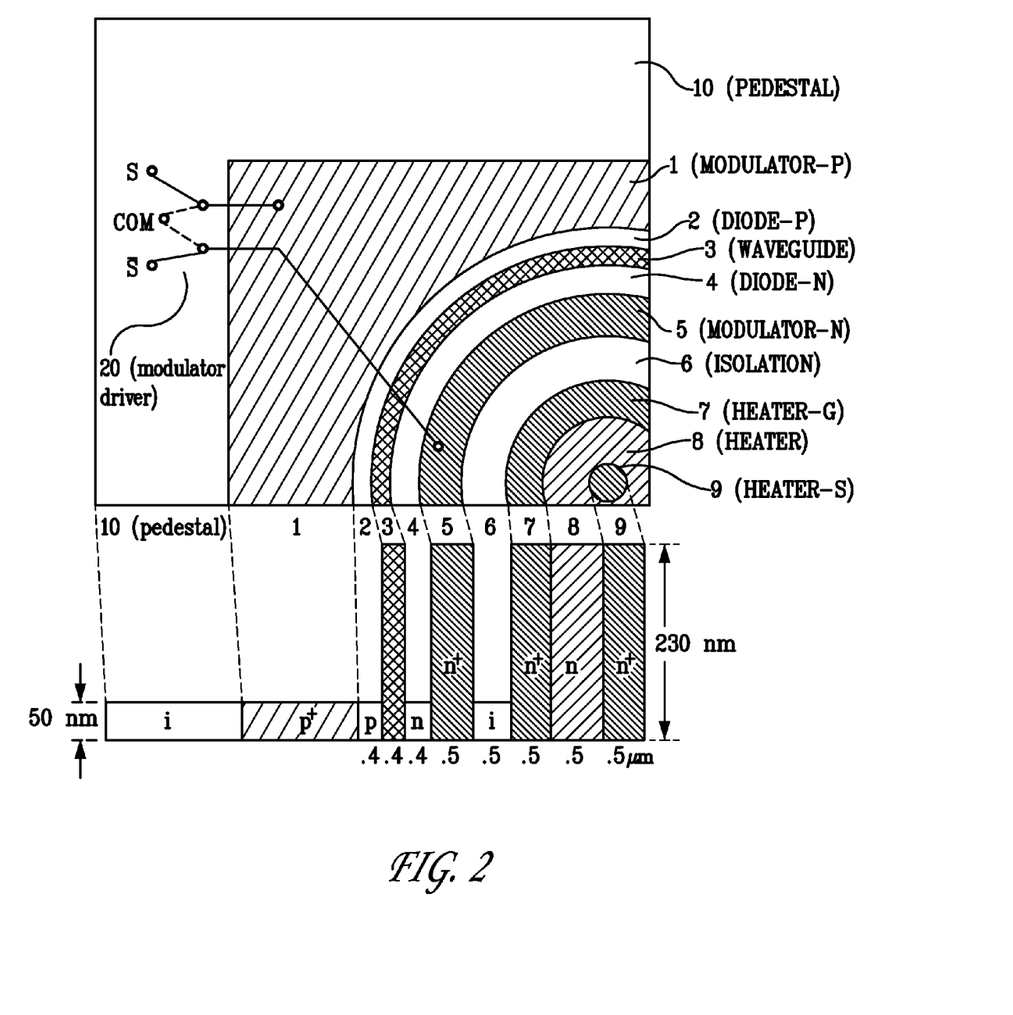
FIG. 2 is a further view of the optical modulator of FIG. 1, in which a portion of the plan view of FIG. 1 is mapped, element-by-element, to a cross sectional view along a section extending from the center portion of the modulator to the edge of its pedestal. Shown as an overlay in the figure is a symbolic representation of a differential modulator driver.

FIGS. 1 and 2 provide views of a new, resonant free-carrier modulator in which the bias voltage is driven by a modulation signal. The exemplary device illustrated in FIGS. 1 and 2 is a horizontal junction microring resonator modulator. In other embodiments, the device may be a vertical junction modulator, and it may be a microdisk rather than microring modulator. A fuller understanding of resonator modulators, and in particular of vertical junction microring resonator modulators, may be gained, for example, in A. Biberman et al, "Adiabatic microring modulators," *Optics Express*, Vol. 20, Issue 28, pp. 29223-29236 (2012), http://dx.doi.org/10.1364/OE.20.029223, the entirety of which is hereby incorporated herein by reference.

As will be seen, the modulator may be driven by differential signaling. Moreover, a heater is provided for thermal tuning of the device. FIGS. 1 and 2 are complementary in that FIG. 1 provides a full plan view of the device, whereas FIG. 2 provides a plan view of only one quadrant of the device, together with a cross-sectional view. Hence it will be useful to consider the two figures concurrently for a full understanding of the device structure.

Turning now to FIGS. 1 and 2, it will be seen that in an exemplary embodiment, an intrinsic silicon pedestal region 10 surrounds a p+-doped modulator contact region 1, which in turn surrounds a sequence of annular regions 2-8 that are concentric with a central p+-doped heater contact region 9. As those skilled in the art will understand, reversing the polarities of all the variously doped regions, e.g. replacing n-type by p-type, etc., will also produce a functioning device.

The various regions shown in the figure are formed, e.g., on a silicon-on-insulator (SOI) substrate. The pedestal 10 and the active silicon regions 1, 2, 4, and 6 are exemplarily 50 nm in height, and the remaining regions, which include waveguide 3, isolation region 5, and regions 7-9 that constitute the heater structure are exemplarily 230 nm in height. Rings 2-4, which constitute the modulator structure (including the waveguide) are each 0.4 μm wide in the exemplary embodiment. Rings 5-8 are exemplarily 0.5 μm wide, and region 9 is exemplarily 0.5 μm in diameter. It will be understood that the widths provided for the respective regions are by way of example and not limitation, and that they can be modified according, for example, to capabilities of the chosen manufacturing process or to spatial design constraints.

Also shown in FIG. 1 (but not in FIG. 2) are input/output waveguide 15, which is situated within an evanescent coupling distance of waveguide 3, and arrows 17 indicating the radial flow of heat from the heater.

The modulator can be driven in forward or reverse bias, it can be driven with AC coupling, and it can be driven with differential signaling.

With further reference to FIGS. 1 and 2, it will be seen that heater signal-level region 9 is an ohmic N+ region doped, e.g., to a concentration of $10^{20}$ cm$^{-3}$. Adjacent to and surrounding region 9 is heater resistive region 8, which is an N-type region doped, e.g., to a concentration of $10^{18}$ cm$^{-3}$. Adjacent to and surrounding region 8 is heater ground-level region 7, which is N+ doped to, e.g., a concentration of $10^{20}$ cm$^{-3}$.

Regions 7-9 constitute the heater, which is effectively a resistor enclosed between two low-resistance ohmic contact regions. The ohmic regions are connected to electrical contact pads. In operation, the contact pads can be driven, for example, with a DC current or with a pulse-width modulated (PWM) signal. A PWM drive may be advantageous in at least some applications because it permits the average heater current to be varied by varying the pulse rate while maintaining a constant peak applied voltage.

Isolation region 6 is an intrinsic silicon region adjacent to and surrounding region 7. Region 6 serves to electrically isolate the heater from the signal that drives the modulator. (The modulation driver circuit is represented schematically as feature 20 of FIG. 2.) In alternate embodiments, region 6 may be replaced by a trench that is etched down to the buried oxide (BOX) layer of the SOI substrate and back-filled with silicon oxide. Such an alternative could provide greater electrical isolation, but because it would also be more thermally isolative than the intrinsic silicon embodiment, it would also tend to decrease the heater efficiency.

Regions 2-4 constitute a p-i-n modulator structure in which waveguide 3 of intrinsic silicon is bounded on one side by an N-type region and on the other side by a p-type region, so that regions 2-4 operate collectively as a p-i-n diode when driven by way of the respective contact regions 1 and 5. In other embodiments, waveguide 3 can be doped half p-type and half n-type, as is known in the art.

Modulator N+ contact region 5, which is adjacent to and surrounds region 6, is ohmically N+ doped to, e.g., a concentration of $10^{20}$ cm$^{-3}$. Region 5 provides electrical contact to the N-type side of the modulator. In various operative scenarios, region 5 may be grounded for operation in forward bias, it may receive the positive voltage signal for operation in reverse bias, or it may receive alternate signal input for AC-coupled operation.

When driven by differential signaling, region 5 can be DC coupled with region 1. DC coupling will be better understood with reference to modulator driver 20 of FIG. 2, which has been drawn as a pedagogic aid to illustrate one example of differential signaling. As shown in the figure, each of the two differential signal inputs S and $\overline{S}$ is toggled between a signal level and a common voltage level COM. In DC coupling, regions 1 and 5 share the same common mode, as indicated in the figure.

It is noteworthy that region 5 is conformed as a ring, because the analogous structure in earlier designs has been disk-shaped.

In the exemplary embodiment, region 4, adjacent to and surrounding region 5, is the inner diode region. It is N-doped to an exemplary concentration of $10^{18}$ cm$^{-3}$. Region 2, adjacent to and surrounding waveguide 3, is the outer diode region. It is P-doped to an exemplary concentration of $10^{18}$ cm$^{-3}$.

Modulator P+ contact region 1 is adjacent to and surrounds region 2. Region 1 is ohmically P+-doped to an exemplary concentration of $10^{20}$ cm$^{-3}$. Although region 1 has been drawn with a rectangular outline, such a shape is merely illustrative and subject to variation as design constraints might dictate. The offset distance between the outer edge of region 1 and the outer edge of region 2 is desirably great enough to accommodate a metal contact to be deposited on region 1, and great enough so that the presence of such a metal contact does not interfere with the optical mode guided within waveguide 3.

In alternate embodiments, P+ modulator contact region 1 can be formed as a raised silicon region or N+ modulator contact region 5 can be formed as a silicon region lowered by etching.

Figure 3:
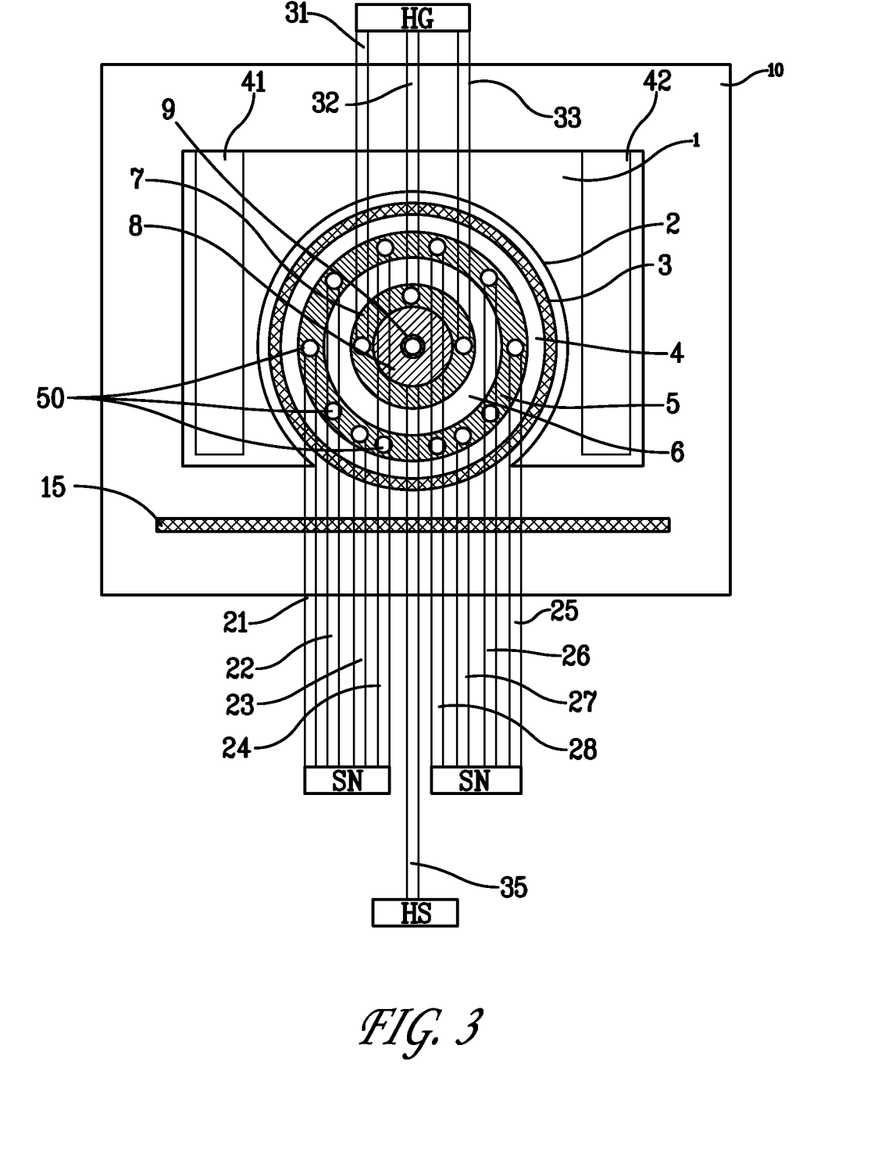
FIG. 3 is a view similar to the view of FIG. 1, but also including an illustrative conductor pattern for making electrical contact to various elements of the illustrated device. Elements common to FIGS. 1, 2, and 3 are indicated in all three figures by like reference numerals.

Those skilled in the art will understand that any of various metallization patterns can be used to effectuate electrical contact to the heater and modulator contact regions. One possible contacting strategy is illustrated in FIG. 3. As seen in the figure, first-level metallization lines 21-24 and 25-28 make contact with region 5, first-level metallization lines 31-33 make contact with region 7, first-level metallization line 35 makes contact with region 9, and contact pads 41 and 42 make contact with region 1. As shown in the figure, each metallization line makes contact with its respective contact region by way of one or more vias 50. In some variations of the illustrative metallization pattern, lines connecting to a common contact region may be merged. Vias may likewise be merged.

Figure 4:
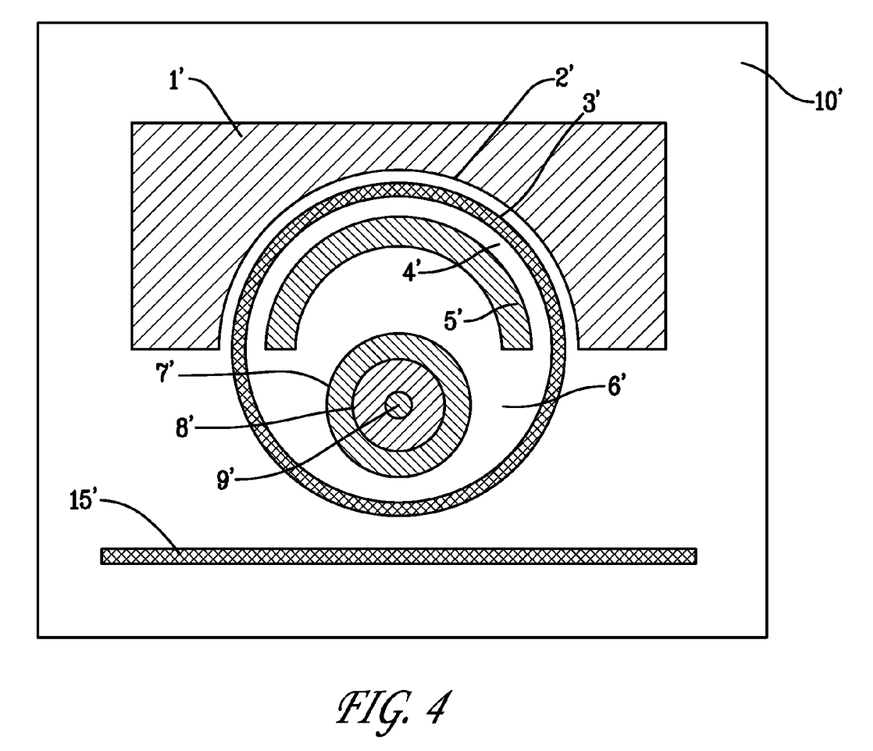
FIG. 4 is a top-down plan view of an optical modulator according to the invention in an alternate embodiment in which the heater assembly is laterally displaced relative to the embodiment of FIGS. 1 and 2, and in which the modulator describes less than a full circular arc.

Numerous variations of the configuration illustrated in FIG. 1 may be implemented without departing from the scope and spirit of the invention. One exemplary variation is illustrated in FIG. 4. The elements identified in FIG. 4 by the reference numerals 1'-10' and 15' are analogous in function and similar in width and height to the respective elements 1-10 and 15 of FIGS. 1 and 2. As seen in FIG. 4, the heater assembly 7'-9', although still a concentric structure, is no longer concentric with the modulator structure 2'-4'. Instead, the heater assembly has been laterally shifted to a position still lying within the ring defined by waveguide 3', but farther from the driving electronics (not shown) and nearer waveguide 3'. Modulator structure 2'-4' describes a semicircular arc, and N+ modulator contact region 5' likewise describes a semicircular arc.

The embodiments described here, and others, are fabricable by CMOS fabrication techniques that are well known to those skilled in the art and need not be described here in detail. Briefly, according to one exemplary process flow, a base SOI wafer is patterned and etched to define the waveguide, heater and contact regions. The diode, contact, and heater regions are doped by ion implantation. An oxide layer is then deposited over the entire structure. Vias for electrical contact are then formed by patterning the oxide layer, etching the via holes in the oxide, and depositing contact metal in the via holes. Standard techniques are then used to form such interconnect layers as are required through patterning, etching, and deposition of metal and oxide layers.

In the example provided by FIGS. 1 and 2, the composite structure consisting of the heater structure, the isolation region, and regions 2-5 of the modulator structure has an outer diameter of 3.45 μm. It will generally be possible to provide such a structure with an outer diameter of 10 μm or less, and in some implementation as little as 4 μm or even less. As noted above, the offset distance between the outer edge of region 1 and the outer edge of region 2 is desirably great enough to accommodate a metal contact to be deposited on region 1, and great enough so that the presence of such a metal contact does not interfere with the optical mode guided within waveguide 3. In some implementations, it will be possible to satisfy such constraints in a composite structure consisting of all of regions 1-9 that fits within a footprint having a maximum lateral dimension that is 10 μm or less.

Figure 5:
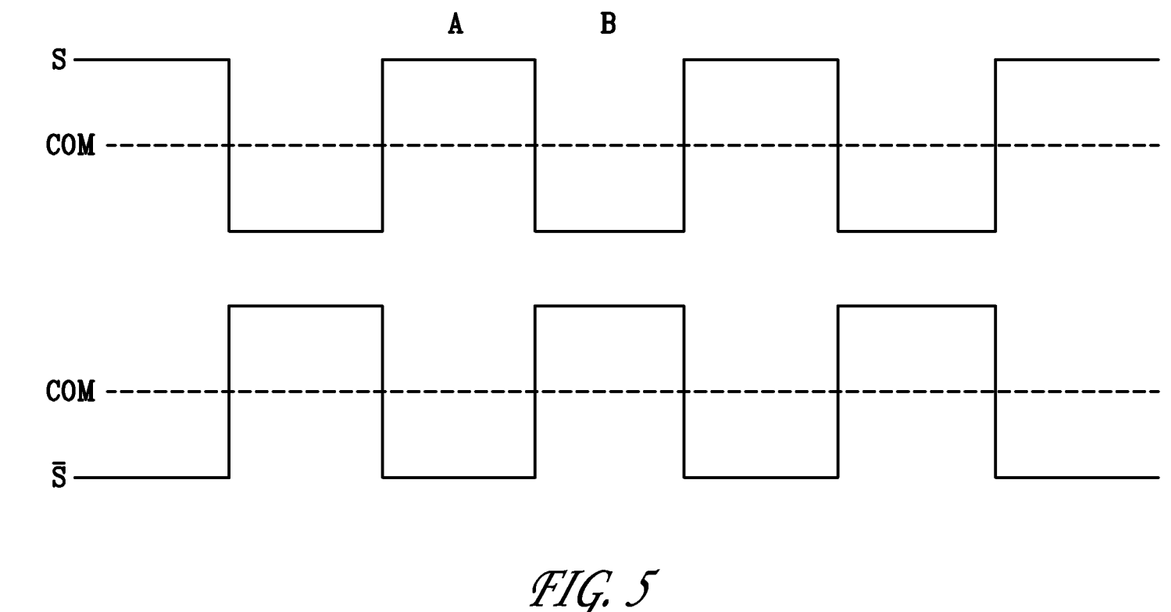
FIG. 5 is included as a pedagogical aid for explaining differential signaling. Shown in the figure is a pair of traces of signal voltage versus time, respectively representing a pulse train applied to the principal signal input S and a corresponding, inverted pulse train applied to the complementary signal input $\overline{S}$.

It was noted above that the modulator can be driven by differential signaling. FIG. 5 is provided as a pedagogical aid to afford a better understanding of what is meant by "differential signaling." Shown in the figure is a pair of traces of signal voltage versus time, respectively representing a pulse train applied to a principal signal input S and a corresponding, inverted pulse train applied to a complementary signal input $\overline{S}$. Each pulse train is seen to oscillate about an intermediate voltage that has been denominated the common voltage level COM. It should be understood that in practice, COM may be a floating voltage level.

We assume for purposes of illustration that each pulse train alternates between a high level that is 0.25V above COM and a low level that is 0.25V below COM. We now consider the differential voltage $\Delta S = S - \overline{S}$ between the respective signal inputs. In time interval A of the figure, the differential voltage $\Delta S_A$ will be 0.5V. Conversely, in time interval B the differential voltage $\Delta S_B$ will be −0.5V. Hence, neglecting parasitic voltage losses, the total voltage swing $\Delta S_A - \Delta S_B$ provided by the drive circuit will be 1.0V.

Figure 6:
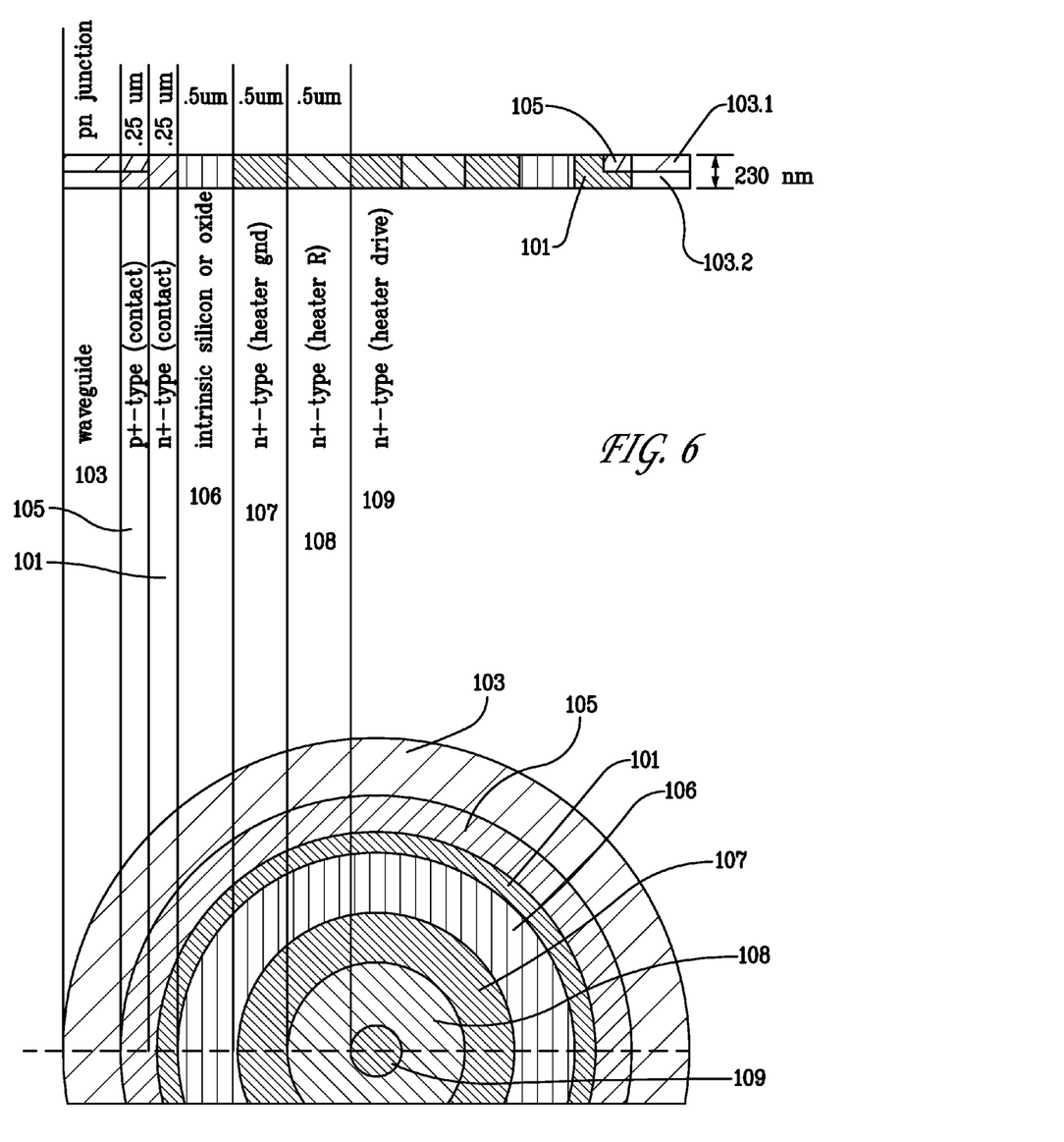
FIG. 6 illustrates an alternate embodiment of the invention as a vertical junction microdisk resonator modulator. The figure includes a partial top-down plan view of the modulator, together with a cross-sectional view along a diameter of the modulator.

FIG. 6 provides a drawing of an alternate embodiment of the invention, in which it is implemented as a vertical junction microdisk resonator modulator. The regions of the figure labeled with the reference numerals 101-109 are analogous in function to the respective regions 1-9 shown in previous figures. It will be seen in the figure that waveguide 103, which is the outermost of a sequence of annular structures, comprises two doped layers which form a pn junction. As shown in the figure, P-doped layer 103.1 is the upper of the two layers, and N-doped layer 103.2 is the lower of the two layers. The annular structure adjacent to waveguide 103, which contains the modulator contact regions, is also layered. As shown in the figure, P+-doped contact region 105 is an upper layer, and N+-doped contact region 101 is formed with an L-shaped profile such that it both underlies and adjoins region 105.

All of the regions shown in FIG. 6 are formed in a silicon layer exemplarily 230 nm in height. Because of the uniform height, the optical mode is subject to less lateral confinement than it is in, e.g., the device of FIGS. 1 and 2. As a consequence, the optical behavior of the device is more characteristic of a disk resonator than of a ring resonator.

Regions 106-108 are exemplarily 0.5 μm wide. Region 101 is exemplarily 0.5 μm wide at its base portion and 0.25 μm wide in its upper portion. Region 105 is exemplarily 0.25 μm wide. The dimensions shown are not meant to be limiting, but instead are subject to variation. In total, the structure shown, as measured by the outer diameter of region 103, will typically be in the range 4-10 μm.

What is claimed:

1. Apparatus for optical modulation, comprising:
   a modulator structure comprising a ring or disk optical resonator having a closed curvilinear periphery and a pair of oppositely doped semiconductor regions within and/or adjacent to the optical resonator and conformed to modify the optical length of the optical resonator upon application of a bias voltage;
   a doped semiconductor modulation contact region situated within an area enclosed by the modulator structure, wherein said contact region is juxtaposed to at least one of the oppositely doped semiconductor regions;
   a heater structure comprising a relatively resistive annulus of semiconductor material enclosed between an inner disk and an outer annulus of relatively conductive semiconductor material, the inner disk and outer annulus being adapted as contact regions for a heater activation current, the heater structure being situated within the periphery of the optical resonator such that in operation, at least a portion of the resonator is heated by radial conductive heat flow from the heater structure; and
   a substantially annular isolation region of dielectric or relatively resistive semiconductor material interposed between the outer annulus of the heater structure and the said doped semiconductor modulation contact region, the isolation region being effective to electrically isolate the bias voltage from the heater activation current.

2. The apparatus of claim 1, wherein the isolation of the bias voltage from the heater activation current, by the isolation region, is sufficient to permit the modulator to be driven by differential signaling.

3. The apparatus of claim 1, further comprising a driver circuit electrically connected to the modulator structure and configured to drive the modulator by differential signaling.

4. The apparatus of claim 1, wherein the modulator structure and the heater structure are formed of silicon.

5. The apparatus of claim 4, wherein the modulator structure and the heater structure are formed on an SOI wafer.

6. The apparatus of claim 4, wherein the isolation region comprises intrinsic silicon.

7. The apparatus of claim 4, wherein the isolation region comprises silicon oxide.

8. The apparatus of claim 1, wherein the modulator structure and the heater structure are substantially circular and concentric.

9. The apparatus of claim 1, wherein the optical resonator comprises a substantially circular waveguide, the heater structure is substantially circular, and the heater structure is non-concentric with the resonator waveguide.

10. The apparatus of claim 1, wherein a horizontal semiconductor junction is defined in the modulator structure.

11. The apparatus of claim 1, wherein a vertical semiconductor junction is defined in the modulator structure.

12. The apparatus of claim 1, comprising in order of increasing radius:
   (a) a contact disk region for the heater structure;
   (b) a resistive heating region for the heater structure;
   (c) a contact annular region for the heater structure;
   (d) an isolation annular region;
   (e) an inner annular contact region for modulator contact;
   (f) an inner annular modulator region doped for forming a semiconductor junction in the modulator structure;
   (g) an annular waveguide;
   (h) an outer annular modulator region, doped oppositely to the inner annular modulator region, for forming a semiconductor junction in the modulator structure; and
   (i) an outer modulator contact region.

13. The apparatus of claim 12, wherein elements (a)-(h) collectively occupy a region having a maximum lateral dimension of 10 μm or less.

14. The apparatus of claim 12, wherein elements (a)-(h) collectively occupy a region having a maximum lateral dimension of 4 μm or less.

15. The apparatus of claim 1, wherein the modulator structure, the heater structure, and the isolation region collectively occupy a region having a maximum lateral dimension of 10 μm or less.

16. A method for modulating an optical signal, comprising:
   coupling the optical signal to a ring or disk resonator via evanescent optical coupling, wherein the resonator describes a closed curvilinear shape having an interior;
   tuning the resonator with heat flowing radially outward from a heating element situated in the interior of the closed curvilinear shape; and modifying an optical length of the resonator through application of a bias voltage, wherein the bias voltage is applied by differential signaling; wherein:

the heating element comprises an inner disk and an outer annulus of relatively conductive semiconductor material and a relatively resistive annulus of semiconductor material enclosed between the inner disk and outer annulus;

the tuning of the resonator comprises passing an electric heater activation current between the inner disk and the outer annulus and through the relatively resistive annulus of semiconductor material;

the bias voltage is applied between a pair of oppositely doped semiconductor regions within and/or adjacent to the optical resonator;

the bias voltage is applied to at least one of the oppositely doped semiconductor regions through a doped semiconductor modulation contact region situated within an area enclosed by the modulator structure, said doped semiconductor contact region is juxtaposed to at least one of the oppositely doped semiconductor regions;

the radial heat flow for tuning the resonator passes through a substantially annular isolation region of dielectric or relatively resistive semiconductor material interposed between the outer annulus of the heating element and the doped semiconductor modulation contact region; and the applying of the bias voltage is electrically isolated, by the interposed isolation region, from the passing of the electric heater activation current.

* * * * *